United States Patent [19]
Knight

[11] Patent Number: 5,825,436
[45] Date of Patent: Oct. 20, 1998

[54] METHOD OF CONTROLLING VIEWABILITY OF A DISPLAY SCREEN AND A DEVICE THEREFOR BY PLACING AN LCD IN FRONT OF A CRT

[75] Inventor: Kenneth R. Knight, Perthshire, Scotland

[73] Assignee: NCR Corporation, Dayton, Ohio

[21] Appl. No.: 711,521

[22] Filed: Sep. 10, 1996

[30] Foreign Application Priority Data

Apr. 19, 1996 [GB] United Kingdom .................. 9608175

[51] Int. Cl.⁶ .............................. G02F 1/133; G09G 5/00; H04K 1/00
[52] U.S. Cl. ...................................... 349/16; 345/3; 345/5; 380/24
[58] Field of Search .................................. 349/16, 1, 33; 345/3, 5; 380/24; 705/43

[56] References Cited

U.S. PATENT DOCUMENTS

| | | |
|---|---|---|
| 4,479,112 | 10/1984 | Hirsch ........................................ 380/52 |
| 4,749,261 | 6/1988 | McLaughlin et al. ..................... 349/16 |
| 4,890,902 | 1/1990 | Doane et al. .............................. 349/16 |
| 5,059,957 | 10/1991 | Todoriki et al. .......................... 345/87 |
| 5,328,580 | 7/1994 | Reamey .................................... 204/484 |
| 5,530,572 | 6/1996 | He ............................................ 349/116 |
| 5,570,141 | 10/1996 | Sirkin et al. ............................. 348/832 |

*Primary Examiner*—William L. Sikes
*Assistant Examiner*—Walter Malinowski
*Attorney, Agent, or Firm*—Michael Chan

[57] ABSTRACT

A display includes a display screen for displaying information. A liquid crystal display (LCD) panel adjoins the display screen. The LCD panel is controlled to selectively define a viewing angle within which a selectable portion of the display screen is viewable through the LCD panel. The LCD panel includes a plurality of energizable segments which, when energized, are transparent to allow the selectable portion of the display screen to be viewed. Each of the plurality of energizable segments is selectively energizable to selectively enable corresponding portions of the display screen to be viewed.

8 Claims, 7 Drawing Sheets

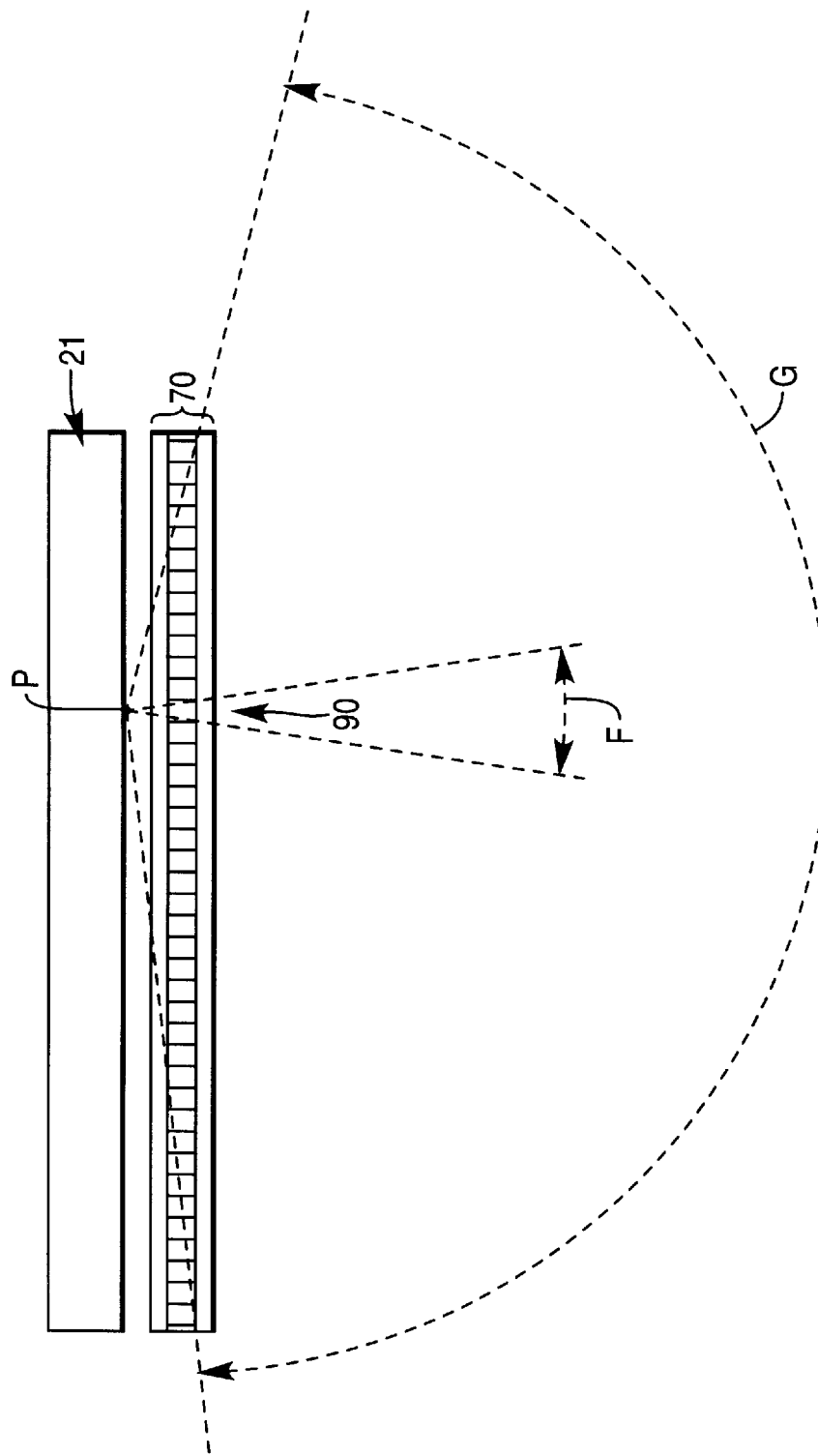

METHOD OF CONTROLLING VIEWABILITY OF A DISPLAY SCREEN AND A DEVICE THEREFOR BY PLACING AN LCD IN FRONT OF A CRT

BACKGROUND OF THE INVENTION

The present invention relates to controlling viewability of a display screen of a display system, and is particularly directed to controlling a liquid crystal display (LCD) panel device to control viewability of a selectable portion of a display screen of a display system to provide privacy of viewing.

A typical display screen of a display system, such as a CRT display, is viewable by a person looking in front of the display screen. In some applications of the CRT display, it is desirable to provide as wide of a viewing angle as possible in front of the display screen. For example, it is usually desirable to provide as wide of a viewing angle as possible in front of the display screen of a CRT display of a television set.

There are also applications of the CRT display in which it is desirable to limit the viewing angle in front of the display screen to provide privacy of viewing. As an example, it is desirable to limit the viewing angle in front of the display screen of the CRT display of an automated teller machine (ATM). A known way to limit the viewing angle in front of the display screen of the CRT display is to connect louvers around the periphery of the display screen. Another known way to limit the viewing angle in front of the display screen of the CRT display is to place a filter over the display screen.

SUMMARY OF THE INVENTION

In accordance with one aspect of the present invention, a method of controlling viewability of a selectable portion of a display screen comprises the steps of locating a liquid crystal display (LCD) panel having energizable segments in a position adjoining the display screen, and selectively energizing segments of the LCD panel such that the selectable portion of the display screen is viewable only within a predetermined viewing angle relative to the selectable portion of the display screen.

In a preferred embodiment, when a first group of segments of the LCD panel is selectively energized, the first group of segments becomes transparent. The person is able to view the selectable portion of the display screen through the LCD panel only when the person within a first viewing angle defined by the first group of energized segments of the LCD panel. When a second group of segments of the LCD panel is selectively energized, the second group of segments also becomes transparent. The person is able to view the selectable portion of the display screen through the LCD panel only when the person within a second viewing angle defined by the first and second groups of energized segments of the LCD panel. The second viewing angle is greater than the first viewing angle.

In accordance with another aspect of the present invention, an apparatus is provided for use with a display having a display screen for displaying information. The apparatus comprises a liquid crystal display (LCD) panel for locating in a position adjoining the display screen. Control means is provided for controlling the LCD panel to selectively define a viewing angle within which a selectable portion of the display screen is viewable through the LCD panel.

Preferably, the LCD panel includes a plurality of energizable segments which, when energized, are transparent to allow the selectable portion of the display screen to be viewed. The control means includes means for selectively energizing the plurality of energizable segments to selectively enable corresponding portions of the display screen to be viewed.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 9 is a view similar to FIG. 5 and showing different LCD segments energized.

DETAILS OF THE INVENTION

Figure 1:
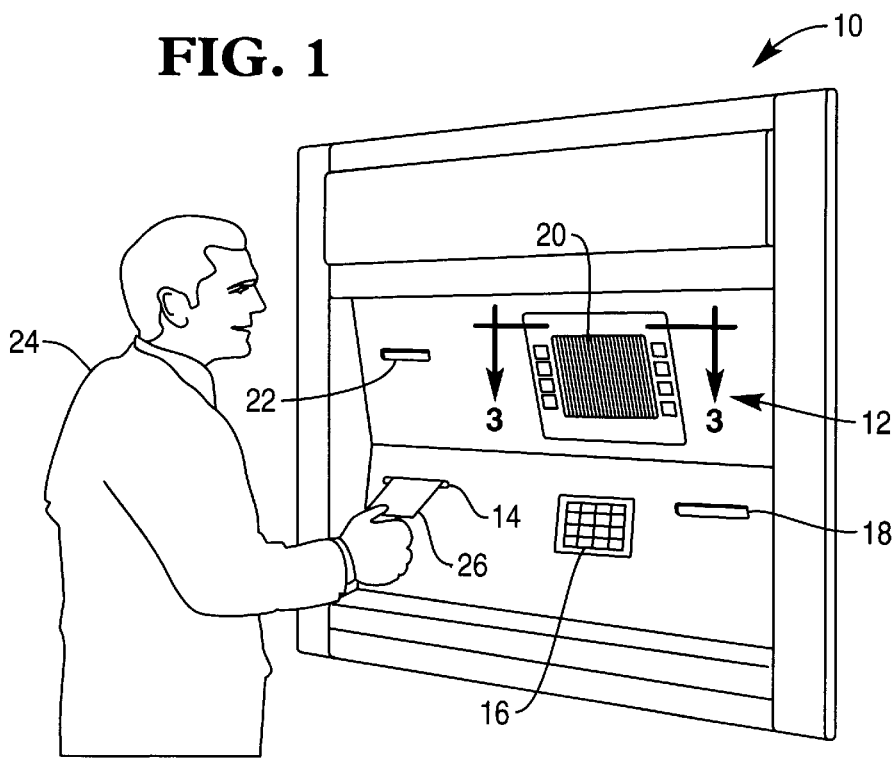
FIG. 1 is a perspective view of an automatic teller machine (ATM) embodying the present invention.

The present invention is directed to viewing a selectable portion of a display screen of a display system. The specific construction and use of the display system may vary. By way of example, an automated teller machine (ATM) 10 embodying the present invention is illustrated in FIG. 1.

The ATM 10 comprises a user interface in the form of a front panel 12. The front panel 12 includes a card reader 14, a key pad 16, a cash dispenser 18, a CRT display 20, and a receipt printer 22. The card reader 14 has a card slot through which a customer 24 can insert a user's identifying card 26 at the commencement of a transaction to be conducted by the customer 24. The cash dispenser 18 has a cash slot through which cash currency notes stored inside the ATM 10 can be delivered to the customer 24 during the transaction. The receipt printer 22 has a receipt slot through which a receipt of the transaction is delivered to the customer 24 at termination of the transaction.

When the customer 24 inserts the user's identifying card 26 into the card slot of the card reader 14, the card reader reads data contained on the card. The customer 24 is then prompted on the CRT display 20 to enter a personal identification number (PIN) via the key pad 16. After the correct PIN is entered, menus are displayed on the display 20 to enable the customer 24 to carry out the desired transaction. After the transaction is completed, the receipt printer 22 prints a receipt of the transaction and delivers the receipt through the slot of the receipt printer 22 to the customer 24.

Figure 2:
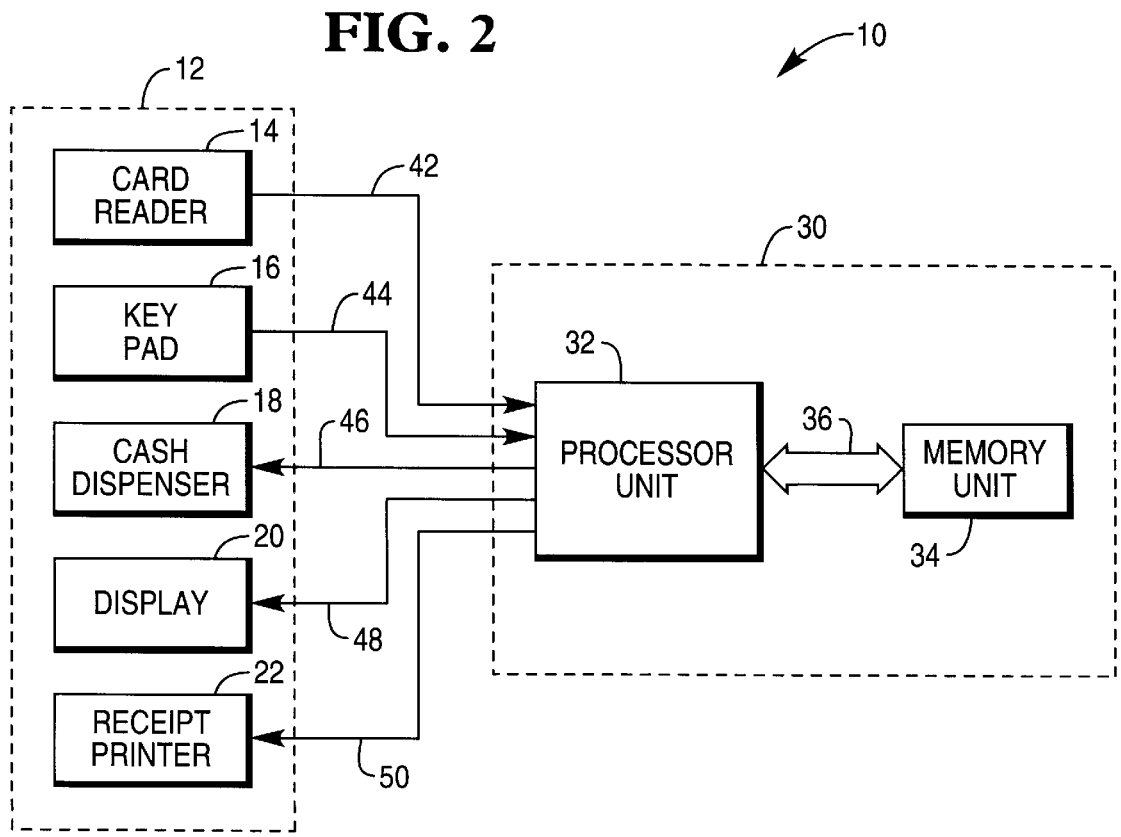
FIG. 2 is a block diagram representation of the ATM of FIG. 1.

Referring to FIGS. 1 and 2, the ATM 10 further comprises a controller unit 30 which communicates with components of the front panel 12. The controller unit 30 includes a processor unit 32, and a memory unit 34 connected via bus line 36 to the processor unit 32. The processor 32 receives input signals on lines 42, 44 from the card reader 14 and the key pad 16, respectively, and provides output signals on lines 46, 48, 50 to the cash dispenser 18, the display 20, and the receipt printer 22, respectively, to control the amount of cash dispensed by the cash dispensed by the cash dispenser 18, the information displayed on the display 20, and the information printed by the receipt printer 22. The processor unit 32 may include a microcomputer, and the memory unit 34 may be non-volatile RAM. Suitable microcomputers and memories are readily available in the marketplace. Their structure and operation are well known and, therefore, will not be described.

Figure 3:
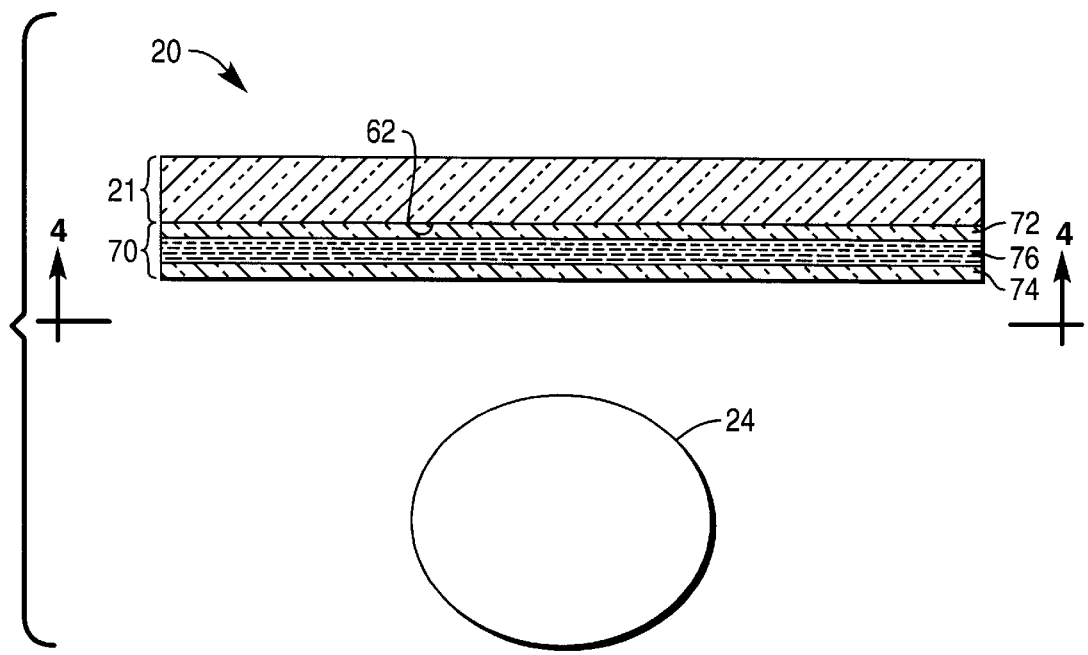
FIG. 3 is a sectional view, taken approximately along line 3—3 of FIG. 1, showing a liquid crystal display (LCD) panel device in contact with a display screen.
Figure 4:
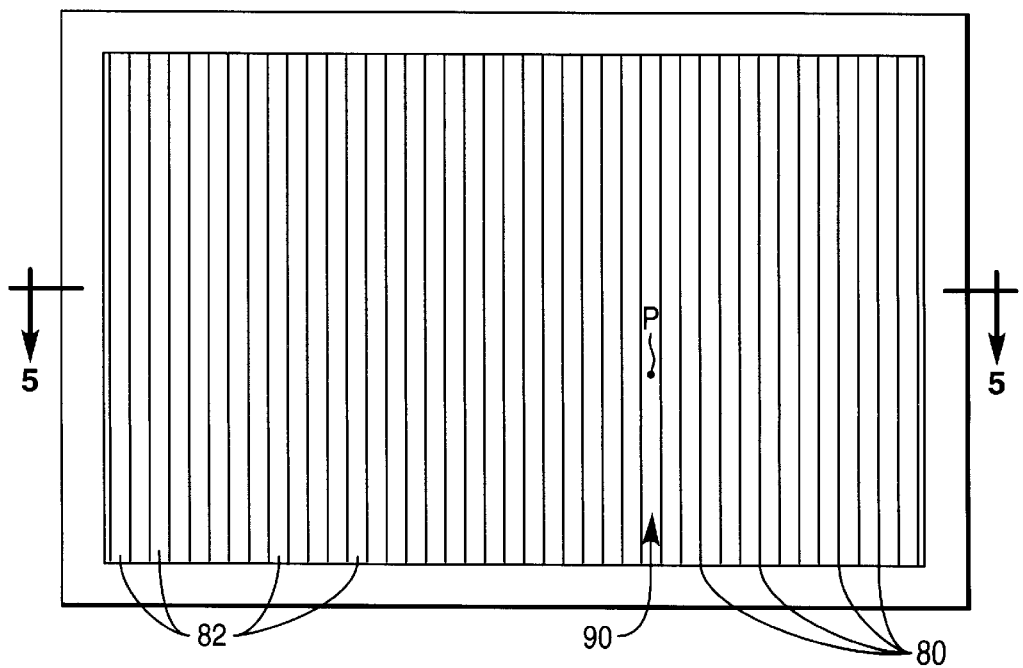
FIG. 4 is a view looking in the direction of line 4—4 of FIG. 3 and showing certain LCD segments energized.
Figure 5:
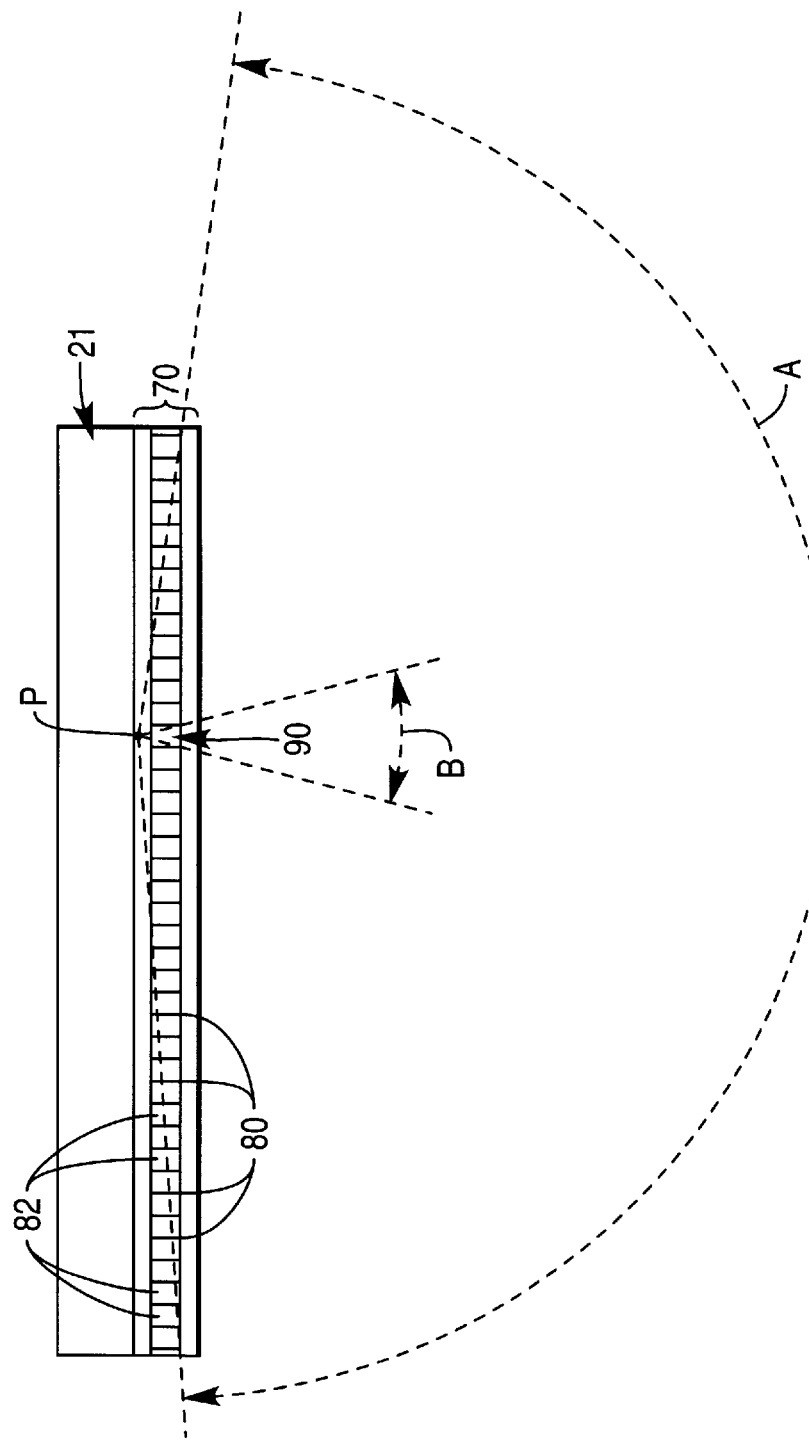
FIG. 5 is a sectional view taken approximately along line 5—5 of FIG. 4.

In accordance with the present invention, as shown in FIG. 3, the display 20 includes a display screen 21 and a liquid crystal display (LCD) panel device 70 which adjoins a front surface 32 of the display screen 21. Preferably, the LCD panel device 70 lies in contact with the front surface 62 of the display screen 21. The LCD panel device 70 is located between the front surface 62 of the display screen 21 and the customer 24 viewing the front surface 32 of the display screen 21, as shown schematically in FIG. 3. Preferably, the LCD panel device 70 overlies the entire viewing area of the display screen 21. Lighting from the display screen 21 of the display 20 provides backlighting to the LCD panel device 70. The LCD panel device 70 includes two planar pieces of material 72, 74 liquid crystal fluid 76 which is sandwiched between the two planar pieces of material to provide an encapsulated structure. Each of the planar pieces 72, 74 comprises transparent material such as clear glass or clear plastic. The LCD panel device 70 includes a plurality (hundreds) of energizable vertical segments 80 which are spaced apart from each other, as best shown in FIGS. 4 and 5. The regions between adjacent vertical segments are transparent and are designated with reference numeral 82. The thickness of the vertical segments 80 and the transparent regions 82 between adjacent vertical segments are shown exaggerated in the Figures for purposes of illustration.

For each vertical segment 80, a pair of electrodes is connected across the two planar pieces of material 72, 74 in the vicinity of the particular vertical segment. When no voltage is applied to the electrodes of the particular vertical segment, the particular vertical segment is transparent. When a suitable voltage is applied to the electrodes of the particular vertical segment, the particular vertical segment is opaque.

When none of the vertical segments 80 are energized (i.e., each vertical segment has no voltage applied thereto), all of the vertical segments are transparent. Accordingly, the display screen 21 is viewable through the entire LCD panel device 70. Each point on the display screen 21 has a viewing angle associated therewith. For example, a point "P" (FIGS. 4 and 5) on the display screen 21 has a viewing angle "A" associated therewith if none of the vertical segments 80 are energized (i.e., if the entire display screen 21 is transparent). It should be noted that the point P on the display screen 21 has been arbitrarily chosen and could have been anywhere on the display screen for purposes of explanation.

As shown in FIGS. 4 and 5, the point "P" is viewable through a transparent window 90 (i.e., one of the transparent regions 82) defined between two corresponding adjacent energized (opaque) segments. The point "P" on the display screen 21 is viewable only within viewing angle "B". Viewing angle B is less than viewing angle A. Viewing angle B is less than viewing angle A because the outermost peripheral lines of view in viewing angle A are blocked by the two adjacent opaque segments which define the transparent window 90. Accordingly, the viewing angle associated with the point "P" on the display screen 21 is more limited than when all of the vertical segments 80 are transparent.

Figure 6:
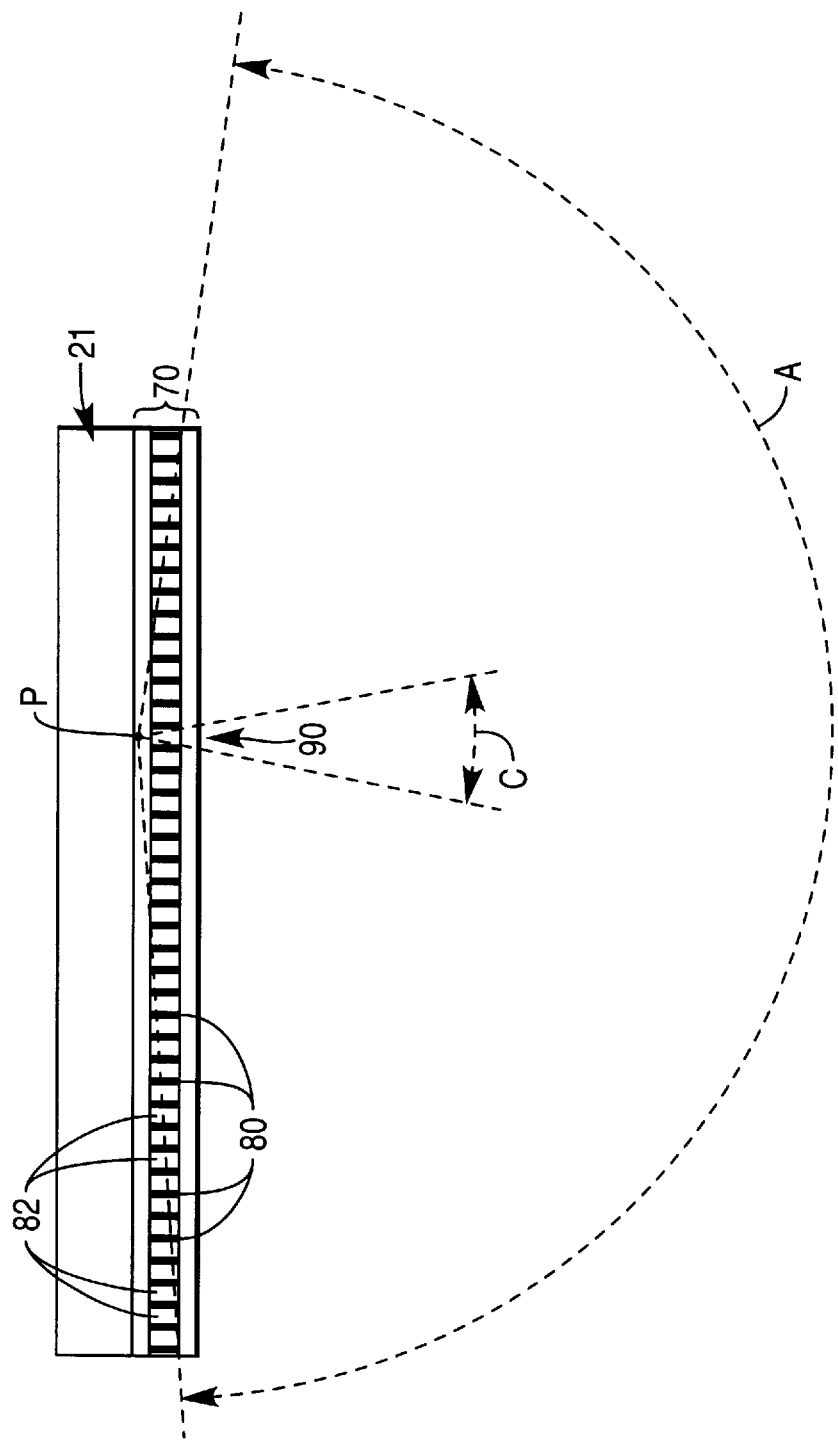
FIG. 6 is a view similar to FIG. 5 and showing different LCD segments energized.

The actual thickness of each of the vertical segments 80 and the actual size of each of the transparent regions 82 between the vertical segments will depend upon a number of factors including the degree of privacy desired and/or the resolution of the information appearing on the display screen 21. As an example, each of the vertical segments 80 in FIG. 6 is thicker than the vertical segments shown in FIG. 5 such that the transparent regions 82 between adjacent vertical segments shown in FIG. 6 are smaller than the transparent regions between adjacent vertical segments shown in FIG. 5. Accordingly, the point "P" on the display screen 21 in FIG. 6 is viewable only within viewing angle "C" which is less than viewing angle B shown in FIG. 5.

Figure 7:
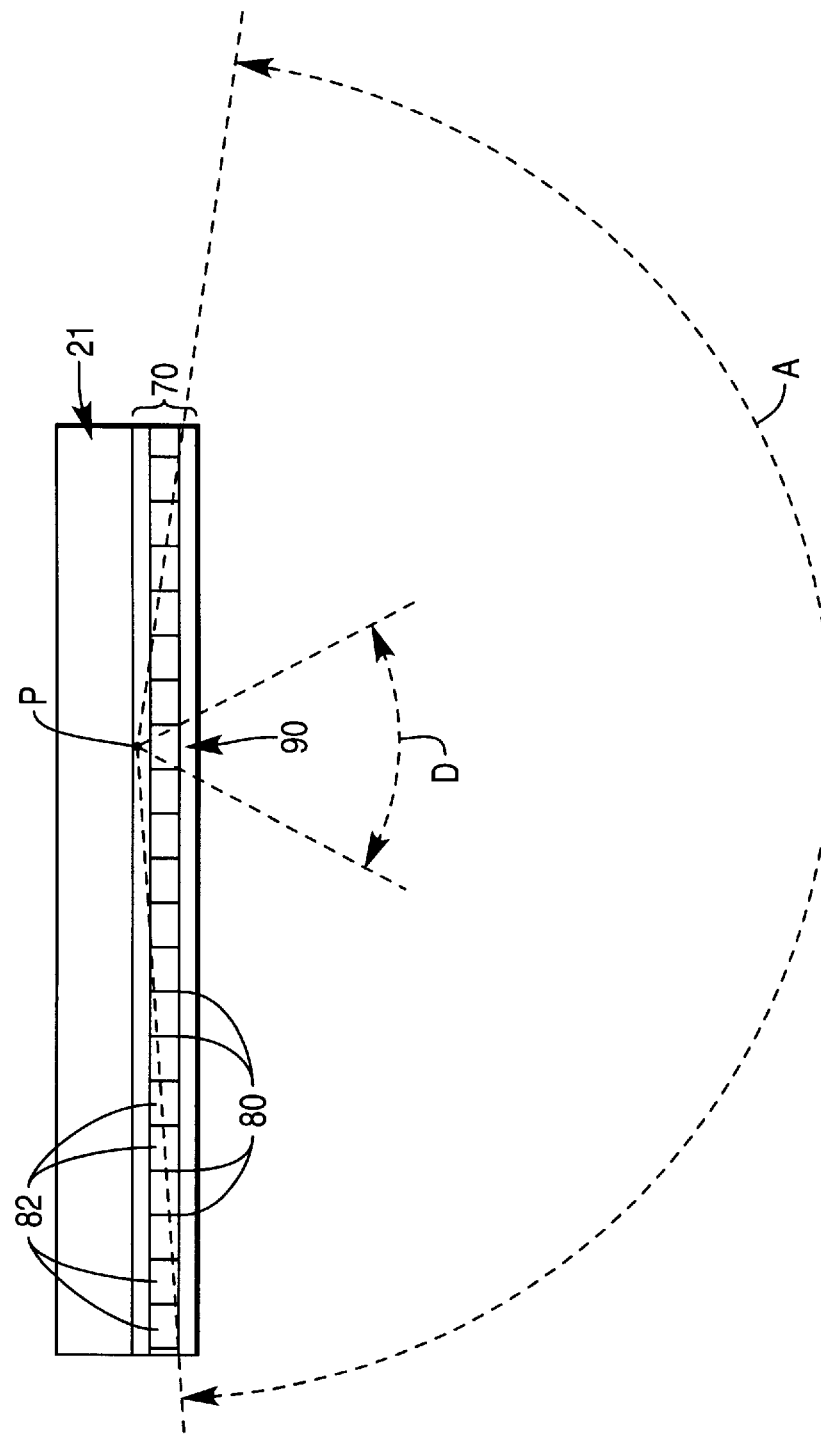
FIG. 7 is a view similar to FIG. 5 and showing different LCD segments energized.

As another example, each of the vertical segments 80 in FIG. 7 has the same thickness as the vertical segments shown in FIG. 5. The vertical segments 80 are spaced farther apart such that the transparent regions 82 between adjacent vertical segments shown in FIG. 7 are larger than the transparent regions between adjacent vertical segments shown in FIG. 5. Accordingly, the point "P" on the display screen 21 in FIG. 7 is viewable only within viewing angle "D" which is greater than viewing angle B shown in FIG. 5.

Figure 8:
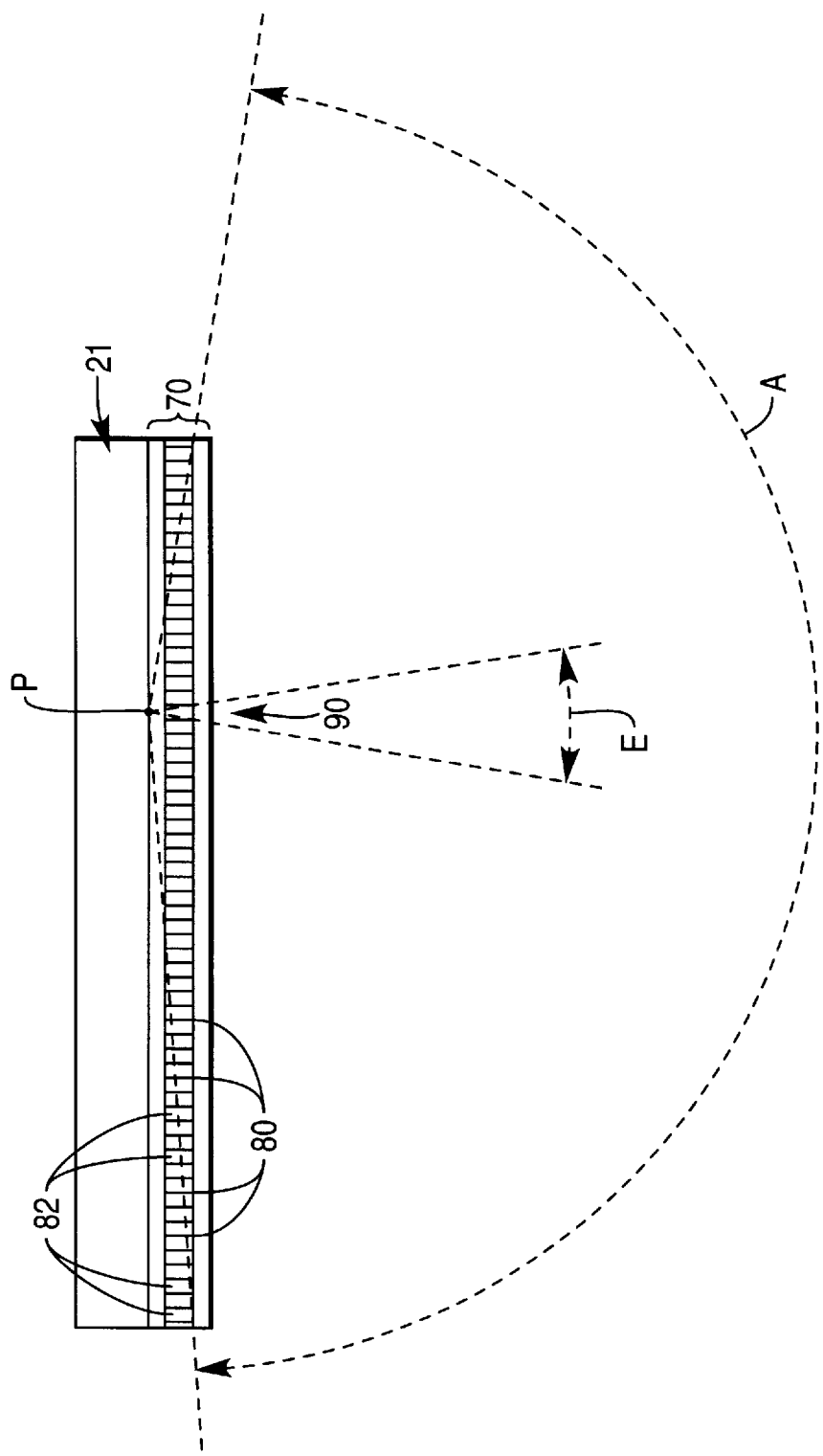
FIG. 8 is a view similar to FIG. 5 and showing the LCD panel device spaced apart from the display screen.

As still another example, each of the vertical segments 80 in FIG. 8 has the same thickness as the vertical segments shown in FIG. 5. The vertical segments 80 are spaced closer together such that the transparent regions 82 between adjacent vertical segments 80 shown in FIG. 8 are small than the transparent regions between adjacent vertical segments shown in FIG. 5. Accordingly, the point "P" on the display screen 21 in FIG. 8 is viewable only within viewing angle "E" which is less than viewing angle B shown in FIG. 5. Thus, the size of the transparent regions 82 between adjacent vertical segments and the thickness of the vertical segments 80 determine the viewing angle of a point ("P" in this example) on the display screen 21.

It is conceivable that the left and right portions of the LCD panel device 70 may have vertical segments which are separately energizable. Accordingly, the left portion of the LCD panel device 70 may be completely transparent while the right portion of the LCD panel device 70 may have opaque vertical segments, or vice versa. Moreover, the LCD panel device 70 may be divided into three or more portions in which each portion has vertical segments which are energizable separately from the vertical segments in each of the other portions.

Although the foregoing describes the LCD panel device 70 lying in contact with the display screen 21, it is contemplated that the LCD panel device 70 could have been spaced apart from the display screen as illustrated in FIG. 9. FIG. 9 is the same as FIG. 5 except the LCD panel device 70 in FIG. 9 is shown spaced apart from the display screen 21. When the LCD panel device 70 is spaced apart from the display screen 21 as shown in FIG. 9, the viewing angles of all points on the display screen 21 are made smaller. For example, as shown in FIG. 9, the viewing angle associated with the point P is indicated as viewing angle "F" which is smaller than viewing angle B shown in FIG. 5. Also, if all vertical segments were to be transparent, the viewing angle in FIG. 9 would be viewing angle "G" which would be smaller than viewing angle A shown in FIG. 5.

It should be apparent that the LCD panel device 70 acts as an intelligent or programmable privacy screen for the display screen 21 of the display system 20. By programming select vertical segments of the LCD panel device 70 to be opaque instead of transparent, the viewing angle of select points on the display screen 21 can be varied and controlled. The programming feature of the LCD panel device 70 provides flexibility to easily change a particular viewing angle of the display screen 21 and to easily design custom privacy screens. Moreover, it is conceivable that a more complex construction of the LCD panel device 70 could allow certain sections of the LCD panel device to be selected such that only select areas of the display screen 21 have the privacy feature. These select areas may be localized anywhere on the display screen 21.

Although the foregoing describes an LCD panel device in which vertical segments are opaque when not energized and transparent when energized, it is contemplated that an LCD panel device in which vertical segments are transparent when not energized and opaque when energized, may be used instead. It is also contemplated that the LCD panel device 70 described hereinabove may be used for advertising messages when the LCD panel device 70 is not being used as a privacy screen. For example, in the ATM 10 described in the specification of the present application, the vertical segments 78 of the LCD panel device 70 may be energized in a way to provide an advertisement when the ATM 10 is not being used by a customer. The LCD panel device 70 can be triggered to provide the privacy screen feature when the customer arrives at the ATM 10 to carry out a financial transaction. The presence of the customer at the ATM 10 may be detected using a proximity sensor or the like.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What we claim is:

1. A method of controlling viewability of a selectable portion of a display screen of a self-service transaction terminal to prevent a person other than a customer carrying out a transaction at the self-service transaction terminal from viewing the selectable portion of the display screen while the customer is carrying out the transaction, the method comprising the steps of:

(a) locating a liquid crystal display (LCD) panel having energizable segments in a position adjoining the display screen; and (b) selectively energizing segments of the LCD panel such that the selectable portion of the display screen is viewable by the customer only within a predetermined viewing angle relative to the selectable portion of the display screen and is unviewable by a person outside the predetermined angle relative to the selectable portion of the display screen.

2. A method of controlling viewability of a selectable portion of a display screen of a self-service transaction terminal to prevent a person other than a customer carrying out a transaction at the self-service transaction terminal from viewing the selectable portion of the display screen while the customer is carrying out the transaction, the method comprising the steps of:

(a) locating a liquid crystal display (LCD) panel having energizable segments in a position adjoining the display screen; and (b) selectively energizing segments of the LCD panel such that (i) the customer is able to view the selectable portion of the display screen through the LCD panel only when the customer is within a viewing angle defined by either non-energized or energized segments of the LCD panel, and (ii) a person other than the customer is unable to view the selectable portion of the display screen through the LCD panel when the person is outside the viewing angle.

3. A self-service transaction terminal for enabling a customer to carry out a desired transaction, the self-service transaction terminal comprising:

means for (i) receiving a user's identifying card from the customer, (ii) reading data from the user's identifying card, and (iii) verifying the data read from the user's identifying card to allow the customer to carry out the desired transaction;

a display including a display screen for displaying information;

a liquid crystal display (LCD) panel adjoining the display screen; and means for controlling the LCD panel to selectively define a viewing angle within which the customer can view a selectable portion of the display screen through the LCD panel and outside of which a person other than the customer is unable to view the selectable portion of the display screen.

4. A self-service transaction terminal according to claim 3, wherein the LCD panel includes a plurality of energizable segments which, when energized, are transparent to allow the customer carrying out the transaction to view the selectable portion of the display screen.

5. A self-service transaction terminal according to claim 4, wherein the control means includes means for selectively energizing the plurality of energizable segments to selectively enable corresponding portions of the display screen to be viewed.

6. A self-service transaction terminal according to claim 3, wherein the control means includes means for (i) selectively energizing a first group of segments of the LCD panel such that the customer is able to view the selectable portion of the display screen through the LCD panel only when the customer is within a first viewing angle defined by the first group of energized segments of the LCD panel, and (ii) selectively energizing a second group of segments of the LCD panel such that the customer is able to view the selectable portion of the display screen through the LCD panel only when the person is within a second viewing angle defined by the second group of energized segments of the LCD panel.

7. A self-service transaction terminal according to claim 3, wherein the LCD panel lies in contact with the display screen.

8. A self-service transaction terminal according to claim 3, wherein the LCD panel is spaced apart from the display screen.

* * * * *